(12) United States Patent
Kim

(10) Patent No.: US 9,381,805 B2
(45) Date of Patent: Jul. 5, 2016

(54) TRACTOR

(75) Inventor: Joong-Ho Kim, Chungcheongbuk-do (KR)

(73) Assignee: DAEHO CO., LTD, Dongi-Myun, Okcheon-Gun, Chungcheongbuk-Do (KR)

( * ) Notice: Subject to any disclaimer, the term of this patent is extended or adjusted under 35 U.S.C. 154(b) by 420 days.

(21) Appl. No.: 13/878,029

(22) PCT Filed: May 24, 2011

(86) PCT No.: PCT/KR2011/003780
§ 371 (c)(1),
(2), (4) Date: Apr. 5, 2013

(87) PCT Pub. No.: WO2012/050284
PCT Pub. Date: Apr. 19, 2012

(65) Prior Publication Data
US 2013/0189066 A1    Jul. 25, 2013

(30) Foreign Application Priority Data
Oct. 11, 2010    (KR) .................. 10-2010-0098567

(51) Int. Cl.
| | |
|---|---|
| *E02F 9/08* | (2006.01) |
| *B60K 17/348* | (2006.01) |
| *B62D 21/00* | (2006.01) |
| *B62D 21/18* | (2006.01) |
| *B62D 49/00* | (2006.01) |
| *B62D 49/06* | (2006.01) |

(52) U.S. Cl.
CPC .............. *B60K 17/348* (2013.01); *B62D 21/00* (2013.01); *B62D 21/186* (2013.01); *B62D 49/00* (2013.01); *B62D 49/06* (2013.01); *E02F 9/08* (2013.01); *B60W 2300/152* (2013.01)

(58) Field of Classification Search
CPC .... B60K 17/34; B60K 17/344; B60K 17/346; B60K 17/348; B62D 21/00; B62D 21/02; B62D 21/05; B62D 21/11; B62D 21/186; B62D 33/0617; B62D 49/00; B62D 49/02; B62D 49/06; B62D 49/0621; E02F 9/08
USPC .......... 180/89.1, 89.12, 89.16, 233, 291, 311, 180/312, 376, 377, 378, 379, 383; 414/561, 414/685, 687
See application file for complete search history.

(56) References Cited

U.S. PATENT DOCUMENTS

| | | | | |
|---|---|---|---|---|
| 5,599,249 | A * | 2/1997 | Zalewski et al. .............. | 475/202 |
| 5,618,156 | A * | 4/1997 | Brown .......................... | 414/694 |
| 5,687,809 | A * | 11/1997 | Braud .......................... | 180/297 |
| 5,836,733 | A * | 11/1998 | Moses et al. .................. | 414/685 |
| 6,030,312 | A * | 2/2000 | Nesbitt et al. ................ | 475/206 |
| 6,071,066 | A * | 6/2000 | Braud .......................... | 414/686 |
| 6,514,031 | B1 * | 2/2003 | Cook ........................... | 414/685 |
| 8,978,810 | B2 * | 3/2015 | Kim ........................ | B62D 7/18 180/233 |
| 2007/0240927 | A1 * | 10/2007 | Kitai et al. .................... | 180/312 |
| 2011/0240393 | A1 * | 10/2011 | Hurd et al. .................... | 180/233 |

* cited by examiner

*Primary Examiner* — Ernesto Suarez
*Assistant Examiner* — Brendan Tighe
(74) *Attorney, Agent, or Firm* — John K. Park; Park Law Firm

(57) ABSTRACT

The present invention provides a tractor which includes a body frame configured such that a front portion thereof adjacent to a front wheel axle is at a raised position to prevent interference with front wheels, and a medial portion thereof is depressed so that an engine can be located in the medial portion. Thereby, the front wheels can be turned to maximum angles without being impeded by the front wheel axle, and a driver cab provided with a driver seat can be located above an area where the engine is disposed.

5 Claims, 3 Drawing Sheets

TRACTOR

TECHNICAL FIELD

The present invention relates, in general, to tractors and, more particularly, to a tractor which includes a body frame configured such that a front portion thereof adjacent to a front wheel axle is at a raised position to prevent interference with front wheels, and a medial portion thereof is depressed so that an engine can be located in the medial portion.

BACKGROUND ART

Generally, a tractor is an engineering vehicle designed to deliver a high tractive force and conduct different kinds of work in the fields of agriculture or construction. At present, tractors used in agriculture typically include a front loader provided on a front end of a tractor body, and an attachment mounted to the front loader so as to conduct various kinds of work, such as transportation, unloading, loading, etc. Furthermore, a rotavator or the like is mounted to a rear end of the tractor body by a rear link so that work such as plowing can be conducted.

In such tractors used in agriculture, power generated from an engine is classified into movement-related power which is transmitted to wheels through a transmission to enable a tractor to move, and PTO (power take-off)-related power which is used to drive different kinds of operating implements mounted to the tractor. To embody transmission of the movement-related power, a four-wheel drive system is typically used.

The conventional tractor is configured such that a body frame has a planar structure. Power of the engine is first transmitted to a rear wheel axle which is collinearly disposed with the engine. The power is thereafter transmitted to a front wheel axle after passing below the engine. Therefore, the engine must be disposed at a comparatively high position, thus raising the center of gravity of the tractor, thereby reducing the stability. Furthermore, there is no choice but to lower the installation position of the front wheel axle.

In a conventional tractor having the above-mentioned construction, the driver cab provided with the driver seat cannot be disposed above the area where the engine is located, whereby the reduction of the size of the body of the tractor is limited. Furthermore, the front wheel axle is disposed at a comparatively low position. Hence, the front wheels can be turned only to a predetermined extent in a clockwise or counterclockwise direction, because the front wheels are impeded by the front wheel axle.

DISCLOSURE

Technical Problem

Accordingly, the present invention has been made keeping in mind the above problems occurring in the prior art, and an object of the present invention is to provide a tractor which includes a body frame configured such that a front portion thereof adjacent to a front wheel axle is at a raised position to prevent interference with front wheels, and a medial portion thereof is depressed so that an engine can be located in the medial portion, whereby the front wheels can be turned to maximum angles without being impeded by the front wheel axle, and a driver cab provided with a driver seat can be located above an area where the engine is disposed.

Technical Solution

In order to accomplish the above object, the present invention provides a tractor, including a body frame configured such that a front portion thereof adjacent to a front wheel axle is at a raised position to prevent interference with front wheels, and a medial portion thereof is depressed so that an engine can be located in the medial portion.

Furthermore, a differential device, a front wheel propulsion shaft and a rear wheel propulsion shaft may be located at positions displaced to one side from a central portion of the body frame, and an engine may be disposed at the other side of the body frame where the differential device, the front wheel propulsion shaft and the rear wheel propulsion shaft are not located.

In addition, a driver cab provided with a driver seat may be disposed above an area where the engine is disposed.

The body frame may further include a through-hole defining part extending a predetermined length and having a through hole through which the front wheel propulsion shaft passes, the through-hole defining part preventing a foreign substance, cast by the front wheels when the tractor is being operated, from entering the body frame.

Further, a rear portion of the body frame adjacent to rear wheels may be configured such that a rear frame provided with a rear link is directly fixed to the body frame.

The rear frame may pass over the rear wheel axle and extend downwards.

The body frame may include a pair of mounting arms so that a rear wheel axle is coupled to the body frame by the pair of mounting arms, wherein the pair of mounting arms is coupled to the body frame such that the rear wheel axle is prevented from being moved sideways and is allowed to be moved upwards or downwards.

In addition, a rotating shaft provided to rotate an articulated arm may be installed in the body frame, and a frame box may be integrally installed in the body frame, the frame box receiving therein a drive device rotating the rotating shaft.

Advantageous Effects

In a tractor according to the present invention, a body frame is configured such that a front portion thereof adjacent to a front wheel axle is at a raised position to prevent interference with front wheels, and a medial portion thereof is depressed so that an engine can be located in the medial portion. Therefore, the front wheels can be turned to maximum angles without being impeded by the front wheel axle. Further, a driver cab provided with a driver seat can be located above an area where the engine is disposed.

In addition, a differential device, the front wheel axle and the rear wheel axle are disposed on the body frame at a position displaced to one side from the central portion of the body frame, and an engine is disposed in an area where the differential device, etc. are not located. A driver's cab provided with a driver's seat is disposed above the area where the engine is located. Therefore, the tractor can have a more stable structure, and the size of the tractor body can be reduced.

Further, a through-hole defining part, which extends a predetermined length and has a through hole through which the front wheel propulsion shaft passes, is provided in a predetermined portion of the body frame. The through-hole defining part can prevent pebbles or the like, which are cast rearwards by the front wheels when the tractor is moving, from entering the body frame.

A rear frame which is provided with a rear link and passes over the rear wheel axle is directly fixed to a rear end of the body frame. Therefore, an operating implement such as a rotavator can be more firmly fixed to the rear end of the tractor by the rear link.

DESCRIPTION OF THE REFERENCE NUMERALS IN THE DRAWINGS

Figure 1:
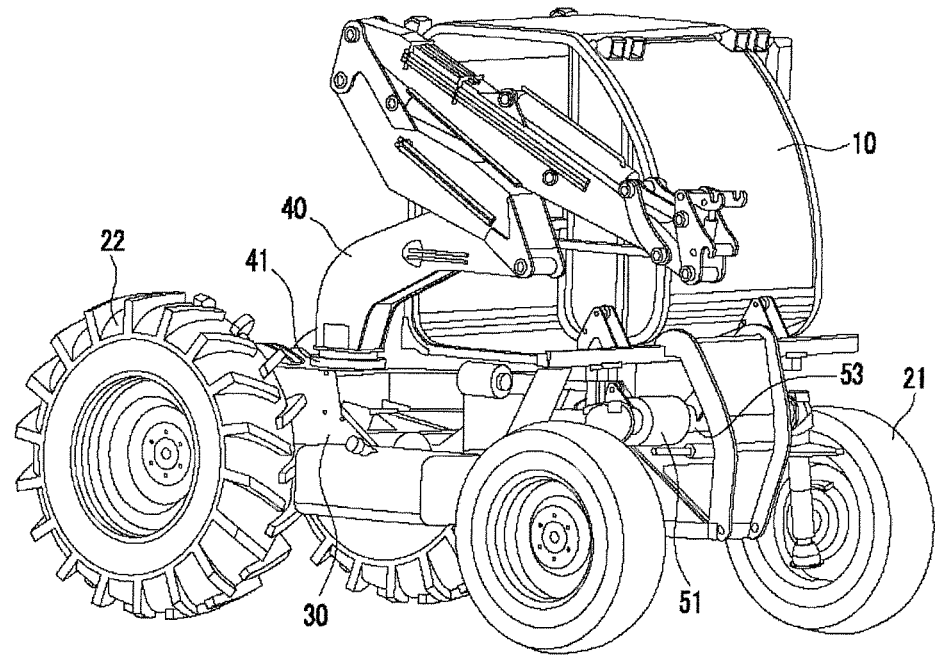
FIG. 1 is a perspective view illustrating a tractor, according to the present invention.

10: driver cab 21: front wheel
21a: front wheel frame 22: rear wheel
22a: rear wheel frame 30: body frame
31: shock absorption frame 32: rear frame
32a: rear link coupling part 33: through-hole defining part
33a: through hole 34: mounting arm
40: articulated arm 41: rotating shaft
51: front wheel differential device 53: front wheel axle
54: rear wheel differential device 55: rear wheel axle
60: frame box 61: rotating shaft installation hole
70: steering apparatus 110: engine
121: clutch 122: main transmission
123: auxiliary transmission 130: central differential device
131: front wheel propulsion shaft
132: rear wheel propulsion shaft
133, 134: universal joint Best Mode Hereinafter, a tractor according to the present invention will be described in detail with reference to the attached drawings.

As shown in FIG. 1, in the tractor with the rotatable articulated arm according to the present invention, a driver cab 10 having a driver seat therein is located on a left side portion of a body frame 30 of the tractor, and an articulated arm 40 is disposed on a portion of the body frame 30 where the driver cab 10 is not located, so as to maintain the balance of the tractor. The articulated arm 40 is coupled to a rotating shaft 41 so that the articulated arm 40 can be rotated along with the rotating shaft 41. In detail, the driver cab 10 is disposed between front wheels 21 and rear wheels 22 of the tractor and located on the left side portion of the tractor such that a space is formed beside the driver cab 10. When the articulated arm 40 is not in use, the articulated arm 40 is maintained in a folded state in this space. The present invention is not limited to the structure of FIG. 1.

Figure 2:
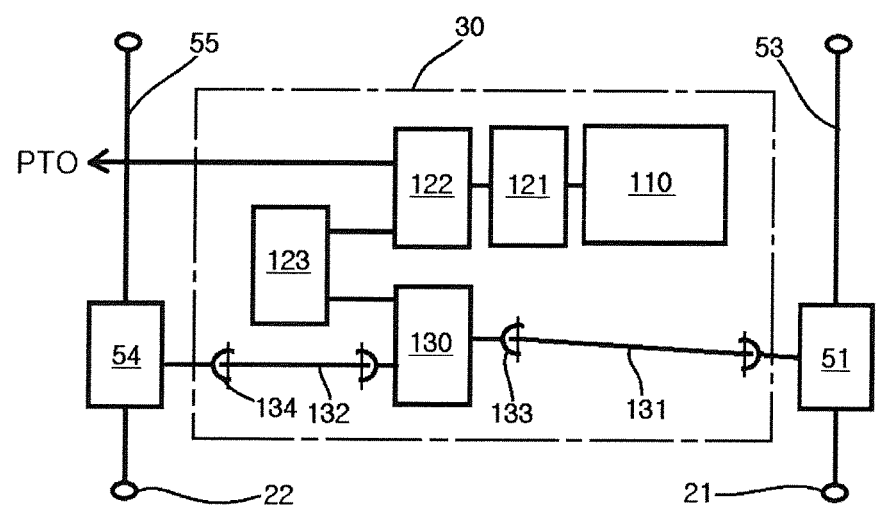
FIG. 2 is a perspective view showing an embodiment of a power system of the tractor according to the present invention.

A power system and structure of the tractor according to the present invention will be explained with reference to FIG. 2.

The tractor of the present invention is a four-wheel drive tractor. Rotating power generated from an engine 110 such as a diesel engine is transmitted via a clutch 121 to a main transmission 122 which changes the speed of the power generated from the engine 110. An auxiliary transmission 123 is provided behind the main transmission 122. The auxiliary transmission 123 is connected to a central differential device 130 so that the power can be transmitted to front wheels 21 and rear wheels 22 by the central differential device 130.

Power transmitted from the main transmission 122 is distributed to PTO and the auxiliary transmission 123. The power transmitted from the auxiliary transmission 122 is transmitted to the central differential device 130.

The central differential device 130 distributes power to a front wheel propulsion shaft 131 and a rear wheel propulsion shaft 132 which are respectively connected to universal joints 133 and 134. The front wheel propulsion shaft 131 and the rear wheel propulsion shaft 132 respectively transmit power to a front wheel differential device 51 and the rear wheel differential device 54.

Each of the central differential device 130, the front wheel differential device 51 and the rear wheel differential device 54 includes a final reduction gear and a differential gear. The final reduction gears of the front and rear wheel differential devices reduce speed of power transmitted to the front wheel propulsion shaft and the rear wheel propulsion shaft (in a ratio of 4-8:1), convert the direction of the transmission of power to an approximate right angle, and respectively transmit the power to a front wheel axle 53 and a rear wheel axle 55. The differential gears make it possible to vary the rpms of both the right and left wheels of the front wheels 21 and the rear wheels 22, whereby when the tractor runs on an uneven road or turns in one place, the wheels can easily and smoothly rotate. As such, the present invention includes the three differential devices, that is, the central differential device 130, the front wheel differential device 51 and the rear wheel differential device 54 so that the tractor can be operated in an AWD (all wheel drive) manner.

The central differential device 130 controls a difference in the rpms of both front wheels 21 and a difference in the rpms of both rear wheels 22 such that the front wheels 21 are prevented from being pushed by the rear wheels 22 when the front wheels 21 are turned to the maximum angles. The central differential device 130 transmits power to the front wheel differential device 51 and the rear wheel differential device 54.

The structure of the body frame and the arrangement structure of the power system according to the present invention will be described in detail with reference to FIGS. 3 through 6.

Figure 3:
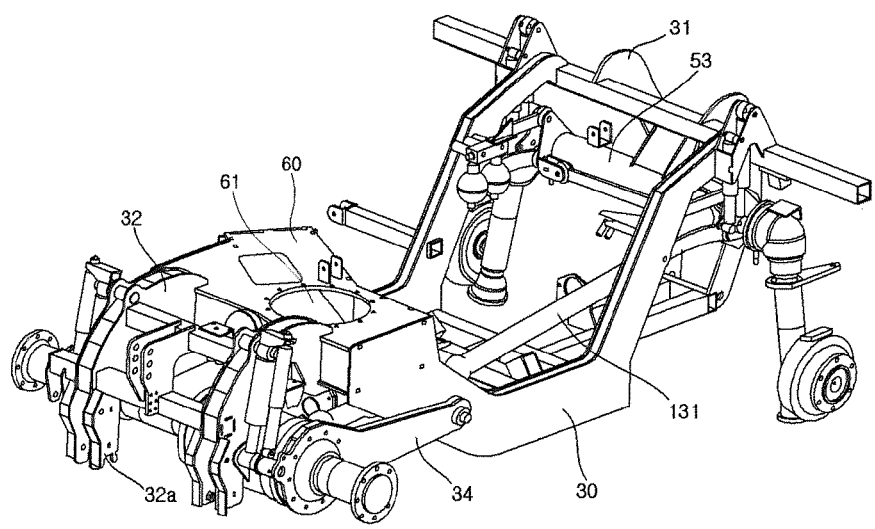
FIG. 3 is a rear perspective view of a body frame according to the present invention.
Figure 4:
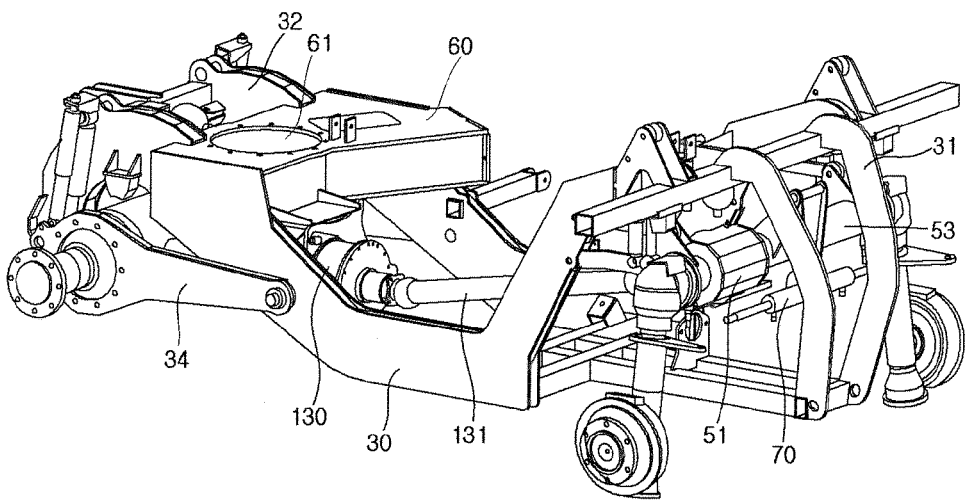
FIG. 4 is a front perspective view of the body frame according to the present invention.
Figure 5:
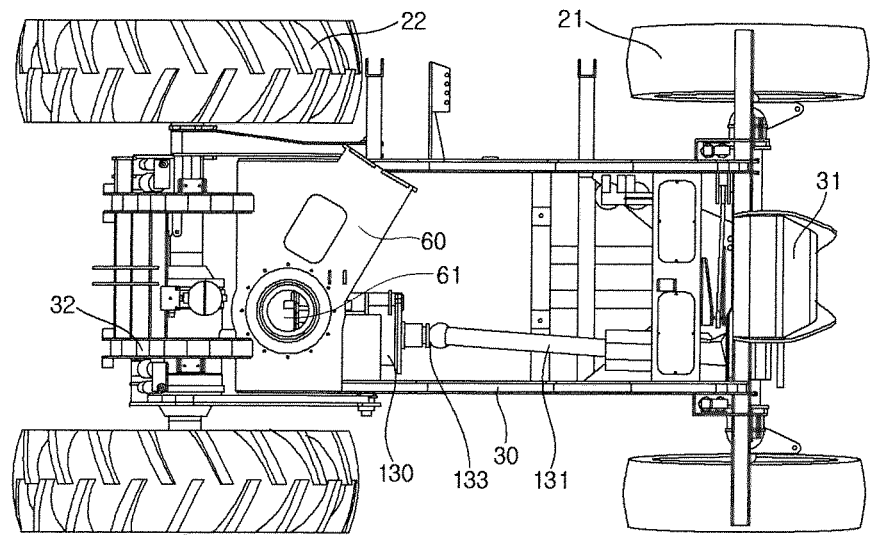
FIG. 5 is a plan view illustrating the tractor according to the present invention.
Figure 6:
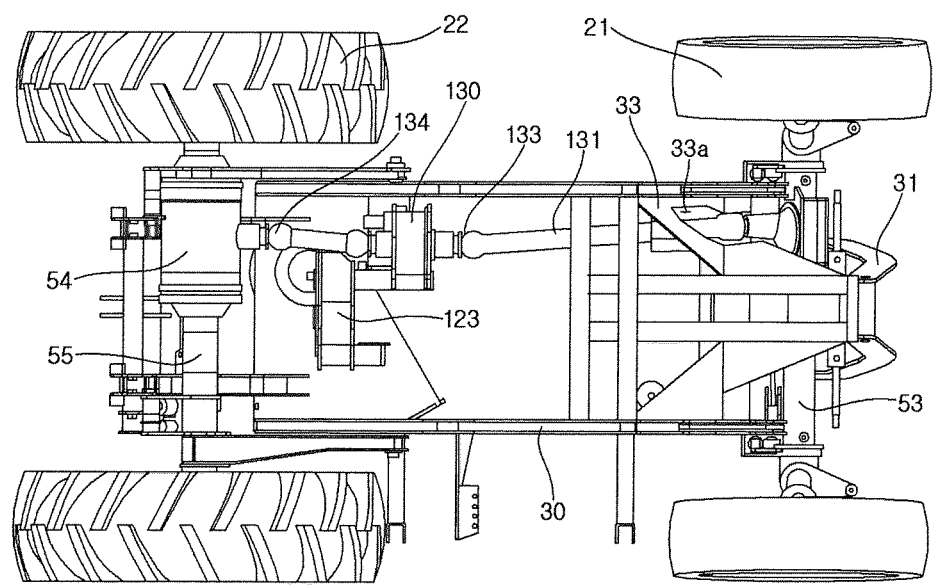
FIG. 6 is a bottom view illustrating the tractor according to the present invention.

As shown in FIGS. 3 and 6, the body frame 30 according to the present invention is disposed between the front wheel axle 53 and the rear wheel axle 55. The front wheel axle 53 is coupled to a front end of the body frame 30, and the rear wheel axle 55 is coupled to a rear end thereof. The body frame 30 is configured such that the front end to which the front wheel axle 53 is coupled is disposed at a position higher than the rear end to which the rear wheel axle 55 is coupled, and a medial portion of the body frame 30 is depressed so that the engine 110 can be located in the medial portion of the body frame 30.

The front wheel axle 53 is disposed at a comparatively high position such that when the front wheels 21 are completely turned, the front wheels 21 are prevented from being impeded by the front wheel axle 53.

To couple the rear wheel axle 55 to the body frame 30, left and right mounting arms 34 are provided at predetermined positions on the rear wheel axle 54 and are respectively coupled to opposite side surfaces of the body frame 30. The left and right mounting arms 34 couple the rear wheel axle 55 to the body frame 30 such that the rear wheel axle 55 is prevented from moving in a transverse direction of the body frame 30 and is allowed to move upwards or downwards. The present invention includes the mounting arms 34 having the above-mentioned construction, whereby the rear wheel axle 55 can move upwards or downwards, thus conducting a shock absorption function. Furthermore, the mounting arms 34 further include a fixing means for preventing the mounting arms 34 from moving upwards or downwards when the tractor is carrying out work in one place.

A shock absorption frame 31 is installed on the front end of the body frame 30 to protect the tractor from shock when the tractor which is being operated collides with an obstacle.

Furthermore, a steering apparatus 70 is installed between a front surface of the front wheel axle 53 and the shock absorption frame 31. The steering apparatus 70 receives steering force transmitted from a steering wheel (not shown) by a means of hydraulic pressure and steers the front wheels 21. The steering apparatus 70 is not a key characteristic of the present invention, therefore further explanation is deemed unnecessary.

A rear frame 32 provided with a rear link coupling part 32a is coupled to the rear end of the body frame 30 on which the rear wheel axle 55 is installed. The rear frame 32 is configured such that it passes over the rear wheel axle 55 and extends downwards so as to prevent it from interfering with the rear wheel axle 55. Furthermore, an operating implement such as a rotavator which conducts plowing work is mounted to the rear link 32.

Because the rear frame 32 having the rear link coupling part 32a is directly fixed to the body frame 30, an operating implement such as a rotavator can be more firmly fixed to the rear link coupling part 32a without interfering with the rear wheel axle 55.

The central differential device 130, the front wheel differential device 51 and the rear wheel differential device 54, that is, the differential devices, along with the front wheel propulsion shaft 131 and the rear wheel propulsion shaft 132, are disposed at positions displaced to one side from the central portion of the body frame 30. The engine 110 is disposed on an area of the body frame 30 where the differential devices, the front wheel propulsion shaft 131 and the rear wheel propulsion shaft 132 are not located.

Thanks to the above-mentioned arrangement of the elements, the position of the engine 110 can be lowered so that the center of gravity of the tractor can also be lowered, and the front wheel axle 53 can be disposed higher than the rear wheel axle 55.

In addition, the driver cab 10 provided with the driver seat is disposed above the area where the engine 110 is located such that the driver cab 10 is displaced to one side from the central portion of the body frame 30.

The front wheel axle 53 is disposed at a position higher than the rear wheel axle 55. The front wheel propulsion shaft 131 which transmits power from the central differential device 130 to the front wheel differential device 51 is inclined upwards.

Furthermore, a through-hole defining part 33, which extends a predetermined length and has a through hole 33a through which the front wheel propulsion shaft 131 can pass, is provided in a predetermined portion of the body frame 30 [in the portion of the body frame 30 that corresponds to the right upper portion of FIG. 6].

The portion of the through-hole defining part 33 that extends the predetermined length functions as a fender which prevents pebbles or the like, which are cast rearwards by the front wheels 21 when the tractor is moving, from entering the body frame 30 and damaging the engine or the other elements.

A rotating shaft installation hole 61 is formed at a predetermined position in an upper portion of the body frame 30, and the rotating shaft 41 which rotates the articulated arm 40 is installed in the rotating shaft installation hole 61. A frame box 60, which has an appropriate width and height to receive a drive device for rotating the rotating shaft 41 therein, is integrally installed in the body frame 30.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A tractor, comprising a body frame configured such that a front portion including a front wheel axle and a front wheel differential device are disposed at a raised position to prevent interference with front wheels, and a medial portion thereof is depressed so that an engine can be located in the medial portion, wherein a differential device, a front wheel propulsion shaft and a rear wheel propulsion shaft are located at positions displaced to one side from a central portion of the body frame, and the engine is disposed at the other side of the body frame where the differential device, the front wheel propulsion shaft and the rear wheel propulsion shaft are not located, wherein the body frame further comprises a through-hole defining part extending a predetermined length and having a through hole through which the front wheel propulsion shaft passes, the through-hole defining part preventing a foreign substance, cast by the front wheels when the tractor is being operated, from entering the body frame, wherein a rotating shaft installation hole is formed at a predetermined position in an upper portion of the body frame, and a rotating shaft which rotates an articulated arm is installed in the rotating shaft installation hole, and a frame box, which has an appropriate width and height to receive a drive device for rotating the rotating shaft therein, is integrally installed in the body frame.

2. The tractor according to claim 1, wherein a driver cab provided with a driver seat is disposed above an area where the engine is disposed.

3. The tractor according to claim 1, wherein a rear portion of the body frame adjacent to rear wheels is configured such that a rear frame provided with a rear link is directly fixed to the body frame.

4. The tractor according to claim 3, wherein the rear frame passes over the rear wheel axle and extends downwards.

5. The tractor according to claim 1, wherein the body frame comprises a pair of mounting arms so that a rear wheel axle is coupled to the frame by the pair of mounting arms, wherein the pair of mounting arms is coupled to the body frame such that the rear wheel axle is prevented from being moved sideways and is allowed to be moved upwards or downwards.

* * * * *